(12) United States Patent
Lautenschlager et al.

(10) Patent No.: US 12,207,031 B2
(45) Date of Patent: Jan. 21, 2025

(54) METHOD AND SYSTEM TO IMPLEMENT A DEMARCATION POINT BETWEEN A PROVIDER NETWORK AND A CUSTOMER NETWORK

(71) Applicants: Deutsche Telekom AG, Bonn (DE); ADVA Optical Networking SE—Headquarters, Munich (DE)

(72) Inventors: Markus Lautenschlager, Cadolzburg (DE); Markus Klumb, Bergisch Gladbach (DE); Sander Jansen, Germering (DE); Christophe Meyer, Meiningen (DE)

(73) Assignees: DEUTSCHE TELEKOM AG, Bonn (DE); ADTRAN NETWORKS SE, Meiningen (DE)

( * ) Notice: Subject to any disclaimer, the term of this patent is extended or adjusted under 35 U.S.C. 154(b) by 110 days.

(21) Appl. No.: 18/048,867

(22) Filed: Oct. 24, 2022

(65) Prior Publication Data

US 2023/0140721 A1 May 4, 2023

(30) Foreign Application Priority Data

Nov. 2, 2021 (EP) ..................................... 21206060

(51) Int. Cl.
*H04B 10/07* (2013.01)
*H04Q 11/00* (2006.01)

(52) U.S. Cl.
CPC . *H04Q 11/0067* (2013.01); *H04Q 2011/0049* (2013.01); *H04Q 2011/0083* (2013.01)

(58) Field of Classification Search
CPC .............................. H04B 10/07; H04B 10/079
See application file for complete search history.

(56) References Cited

U.S. PATENT DOCUMENTS

| | | | |
|---|---|---|---|
| 5,956,168 A * | 9/1999 | Levinson | H04B 10/2589 398/139 |
| 7,092,362 B1 | 8/2006 | Demakakos et al. | |
| 2008/0267623 A1* | 10/2008 | Manifold | H04J 14/025 398/33 |
| 2015/0147059 A1 | 5/2015 | Kauffeldt et al. | |
| 2019/0386753 A1* | 12/2019 | Martel | H04B 10/071 |
| 2020/0099445 A1* | 3/2020 | Storey | H04B 10/0775 |
| 2022/0353732 A1* | 11/2022 | Filippou | H04W 4/40 |

* cited by examiner

*Primary Examiner* — Shi K Li
(74) *Attorney, Agent, or Firm* — LEYDIG, VOIT & MAYER, LTD.

(57) ABSTRACT

A system installed in a cross-border area between a provider network of a provider and a customer network of a customer includes: a smart optical network termination device (NT) at a site of the customer, wherein the smart optical NT is configured to implement a demarcation point between the customer network and the provider network, and wherein the smart optical NT is independent of a data rate passing through it and an optical interface connected to it; and a monitoring device located at a point of presence (POP) of the provider network. The smart optical NT is further configured to monitor a coupling of optical power by the customer into the provider network and to interact with the monitoring device via at least one traffic analysis point (TAP) for connectivity validation from the POP to the demarcation point.

12 Claims, 2 Drawing Sheets

| Transmission line tap | Customer tap | Switch state |
|---|---|---|
| Low power | Low power | Loop operation |
| Low power | High power | Loop operation |
| High power | Low power | Loop operation |
| High power | High power | Standard operation |

Figure 2

METHOD AND SYSTEM TO IMPLEMENT A DEMARCATION POINT BETWEEN A PROVIDER NETWORK AND A CUSTOMER NETWORK

CROSS-REFERENCE TO PRIOR APPLICATIONS

This application claims benefit to European Patent Application No. EP 21 206 060.2, filed on Nov. 2, 2021, which is hereby incorporated by reference herein.

FIELD

The invention relates to a method and a system to implement a demarcation point between a provider network and a customer network.

BACKGROUND

In current networks active network termination devices (NTs) are used to build a clear demarcation between a respective network edge and customer's premises equipment (CPE). Therefore, a complex and cost intensive hardware installation is needed in the customer's location, which has to be changed when technology changes or whenever the customer upgrades a service, e.g. from 1 Gb/s to 10 Gb/s. Such remote equipment has to be actively monitored and maintained in case of any type of failure and each time a failure occurs, a service provider has to make appointments with the customer, which is often long-lasting and not very profitable in respect to a respective requested service.

Whenever the demarcation device, i.e. the network termination device needs to be replaced, irrespective if a respective root cause is a technology, service or vendor change, a new hardware has to be provided, an appointment with the customer has to be made, all the equipment on a new separate fiber has to be installed, and it has to be verified end to end that everything is working and not till then the service of the customer can be changed. Thereby, each access line from customer site to a POP (Point of Presence) location of the provider must be changed because of the NT equipment at both ends of a service has to be replaced.

SUMMARY

In an exemplary embodiment, the present invention provides a system installed in a cross-border area between a provider network of a provider and a customer network of a customer. The system includes: a smart optical network termination device (NT) at a site of the customer, wherein the smart optical NT is configured to implement a demarcation point between the customer network and the provider network, and wherein the smart optical NT is independent of a data rate passing through it and an optical interface connected to it; and a monitoring device located at a point of presence (POP) of the provider network. The smart optical NT is further configured to monitor a coupling of optical power by the customer into the provider network and to interact with the monitoring device via at least one traffic analysis point (TAP) for connectivity validation from the POP to the demarcation point.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 2 shows a table that gives an overview of operation modes of a smart optical NT as provided by an embodiment of the invention.

DETAILED DESCRIPTION

Figure 1:
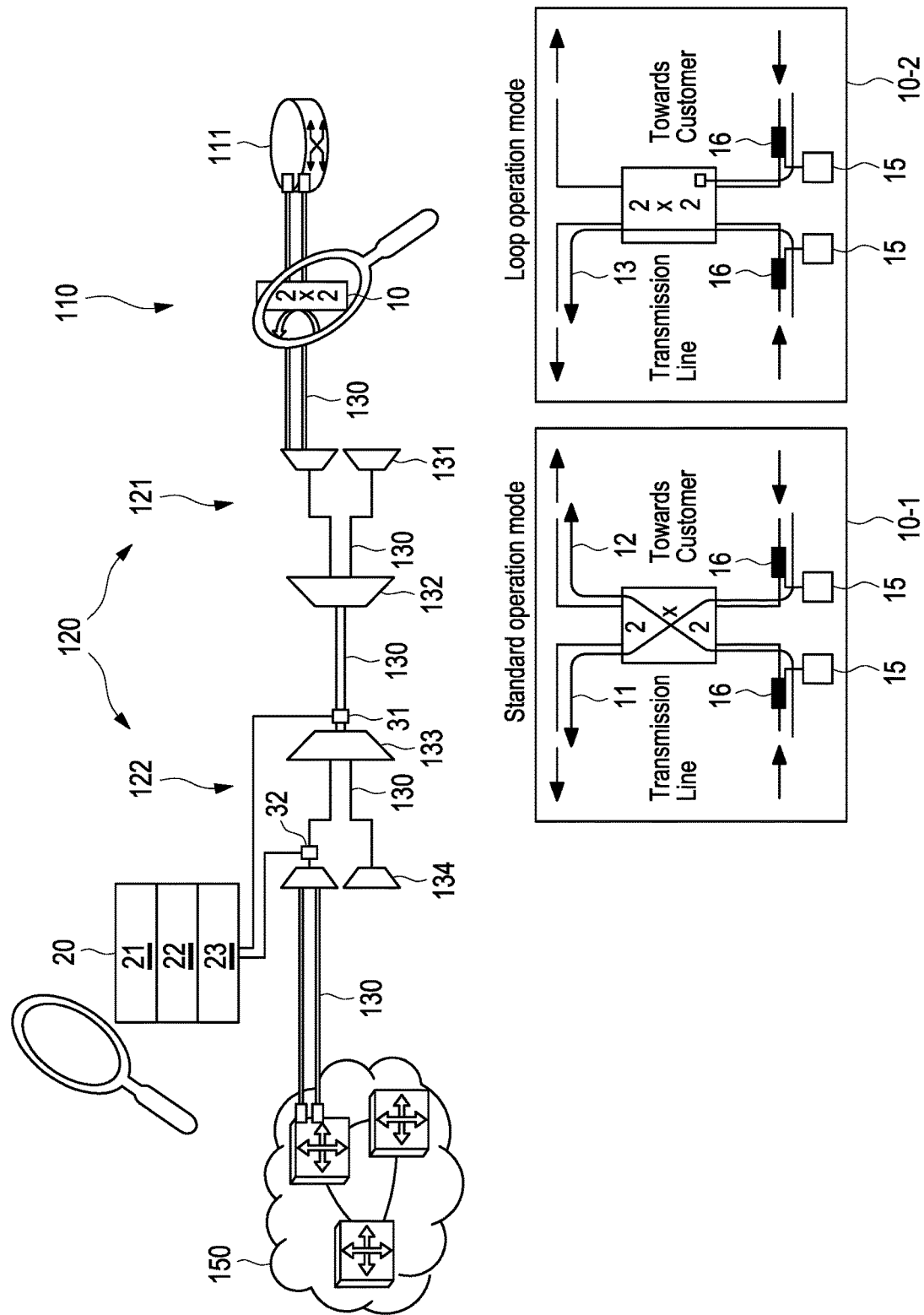
FIG. 1 schematically shows an entity diagram of a system installed in a cross-border area between a provider network of a provider and a customer network, particularly a private/carriers carrier network of a customer, according to an embodiment of the invention.

Exemplary embodiments of the invention provide a method for implementing a demarcation point between a provider network of a provider and a customer network, particularly a private/carriers carrier network of a customer which depends neither on the customer nor on the involved communication technology and allows for a high performance and an easy maintenance. Exemplary embodiments of the invention further provide a respective system for providing a cost-saving and communication technology independent demarcation point implementation.

One aspect of the invention is a system installed in a cross-border area between a provider network of a provider and a customer network of a customer, the system comprises at least:

a smart optical network termination device, NT, that sits on a site of the customer, in the following also called customer's premises equipment, CPE, and implements a demarcation point between the customer network and the provider network, wherein the smart optical NT is independent of a data rate passing through it and an optical interface connected to it, a monitoring unit, MU, located at a site of the provider, in the following also called point of presence, POP, of the provider network, wherein the smart optical NT is configured to monitor a coupling of optical power by the customer into the provider network by measuring an optical power, particularly with a photo diode, in the smart optical NT and to interact with the monitoring unit via at least one traffic analysis point, TAP, for connectivity validation between the POP and the demarcation point by using an optical spectrum analyser and/or an optical channel monitor to check and examine each single service to be provided via the provider network to the customer network.

The customer network may be a carriers carrier network. The provider network may be a public network.

The at least one traffic analysis point, TAP, is located along the optical path between the demarcation point and the POP wherein a portion of the light travelling along the optical path is split out to the monitoring point. The TAP therefore provides access to data transmitted via a respective fiber without corrupting the respective data flow or interfering with a smooth running of the provider network. The TAP diverts a part of the light power within the respective fiber where a TAP could be an optical splitter and/or an optical filter as the case may be.

According to the invention, the smart optical network termination device, NT, serves as demarcation point. The demarcation point defines the interface between the customer network, i.e. the customer-premises equipment (CPE) and the provider network, i.e. the network service provider equipment. In other words, the demarcation point is the physical point where the public network ends and the customer network begins. The demarcation point is sometimes referred to as demarc, or network boundary point. In most cases, the demarcation point defines where a communication wiring coming from provider site physically enters a building of the customer. The provider's wiring runs to the building of the customer and the respective wires are then switched at the demarcation point. Within the scope of the present invention, the cross-border area between the customer network and the provider network defines an area including all components of the system when the system is functionally installed, i.e. when the system is installed in its operating mode.

Generally, the provider network is a public switched network that provides infrastructure and services for public telecommunication and comprises at least some of the following components: telephone lines, optical fibers, microwave transmission links, cellular networks, communications satellites, and undersea communication cables, wherein all included components are interconnected by switching centers.

The customer network comprises a customer premises wiring, i.e. customer-owned telecommunication transmission and/or distribution lines. The transmission lines are optical fibers, and may be installed within or between buildings of the customer or between optical interfaces of a customer CPE in a carriers carrier scenario.

In preferred embodiments of the present invention, the smart optical NT is realized by an optical switch, particularly by a 2×2 optical switch. Such 2×2 optical switch is a cost-effective and small form-factor device that has two input ports and two output ports. The smart optical NT is a passive NT that cannot understand or interpret the transmitted signals between the customer network and the provider network, but it can perform and/or support in combination with the MU an end-to-end control of a service and of a respective connection between the POP and the demarcation point. More preferably, the 2×2 optical switch is a 2×2 optical switch with a loop back function. The 2×2 optical switch can be used with various interrogators to verify whether or not customer's premises equipment is connected via one or more respective channels, e.g. respective optical fibers. Those interrogators may be chosen from the group of:

OCM (Optical Channel Monitor): this monitoring unit receives and, thus, checks a respective spectrum of the connected channels.

Power meter: instead of an OCM, one could measure a total channel power of respective connected channels with a power meter. This would give information on whether or not a respective customer is present and a respective connection line is faultless, but it would not provide information on the channel itself, such as bandwidth etc.

OTDR (optical time-domain reflectometer): if one would use a DWDM (Dense Wavelength Division Multiplexer) OTDR, one could measure a respective fiber length and thereby conclude if a respective customer is present or not.

Preferably, light generated at the POP is used to detect whether or not a respective customer is present. However, alternatively one could use a tunable DWDM laser at the POP as well to probe individual channels.

In some further embodiments, the smart optical NT has at least a first operation mode and a second operation mode, the first operation mode being a pass-through operation mode in which the smart optical NT transmits signals coming through the provider network to a customer endpoint at the customer site and vice versa, and the second operation mode is a loop operation mode in which the smart optical NT loops the signal on the transmission line, e.g. light, optical signals, coming through the provider network from the PoP, as test signals, back to the PoP. It is important to note that in loop operation mode only the signal from the transmission line coming from the provider network is looped back towards the PoP. The signal from the customer is not looped back towards the customer. This would not be good as in some cases the customer might use APD photodiodes and looping back the signal to the customer could damage the receiver in that case. Depending on the operation mode, the 2×2 optical switch is configured in the first operation mode or second operation mode.

In some further embodiments, connectivity validation from the POP to the demarcation point comprises that, whenever a customer signal coming from the customer endpoint is not available at the smart optical NT, the smart optical NT switches to the loop mode and loops a signal from the POP back to the POP and the MU detects the looped back signal and verifies a fiber integrity and insertion loss of an optical path from the POP to the demarcation point, and as soon as a customer signal is present at the smart optical NT, the smart optical NT switches from the loop operation mode (shortly called loop operation) to the pass-through operation mode (shortly called standard operation) for that the customer signal is received at the PoP. In addition, whenever a signal from the transmission line coming from the provider network is not present, the smart optical NT switches as well to loop operation mode. The reason for switching to loop operation mode in this case is to identify to the POP that a connectivity problem is present on that particular channel, e.g. the respective optical fiber so that consecutive actions can be taken. The table shown in FIG. 2 gives an overview of the switch states, i.e. the operation modes of the smart optical NT. The optical power on the transmission line coming from the provider network is measured via respective transmission line TAPs at the smart optical NT and the optical power on communication channels coming from the customer are measured via respective customer TAPs at the smart optical NT with a passive optical power coupler and/or a photodiode, PD, respectively.

According to an embodiment of a system according to the present disclosure, monitoring the coupling of optical power by the customer into the provider network comprises disconnecting a customer connection from the provider network whenever the optical power to be coupled by the customer into the provider network exceeds a laser safety threshold, i.e. an input power threshold of e.g. a maximum of +8 dBm for one connected optical channel measured via a PD (photo diode). Thus, the integrated smart optical NT will prevent the customer from coupling too high optical power into the provider network, i.e. the smart optical NT will prevent an entrance port to the provider network against (too) high optical laser power for fiber and transmission security.

In some other embodiments of the claimed system, the MU comprises a fiber check component and is configured to check optical fiber integrity on an optical path from the POP to the demarcation point by implementing an optical time domain reflectometer, OTDR, function. Therefore, the MU comprises as fiber check component an optical time-domain reflectometer (OTDR) that injects a series of optical pulses into an optical fiber under test along the optical path from the POP towards the customer.

In a preferred embodiment, the MU comprises a channel monitor and is configured to monitor bandwidth usage by measuring an actual and currently available bandwidth on an optical path from the POP to the demarcation point, particularly in granular steps of 1 Gb/s, 10 Gb/s, 25 Gb/s and ≥100 Gb/s to determine if the customer is using a 1G, 10G, 25G or ≥100G signal.

Further advantageously, the MU comprises an internal switch enabling the MU to be used at once for a plurality of different access lines, e.g. for up to 16 different access lines, but could also be more like, for example, 32, 48, 64 etc different access lines. An access line is a communications link connecting a central office of the provider, e.g. the POP of the provider to a respective customer, thus establishing an access for the respective customer to any one of a number of connected service creation platforms. Such service creation platforms may be or may be based on IP (Internet Protocol)/ BNG (Broadband Network Gateway) or OTN (Optical Transport Network). The central office (CO) of the provider network contains switching equipment that connects a respective customer to services requested by the customer. Such central office may consist of a passive central office part and an active central office part containing actively managed components. The POP is located in the active central office part.

Another aspect of the present invention is directed to a method to provide/establish a demarcation point between a provider network of a provider and a customer network of a customer, the method comprises at least the steps to:
  install a smart optical network termination device, NT, on a site of the customer, the NT implementing the demarcation point between the customer network and the provider network, wherein the smart optical NT is independent of a data rate passing through it and an optical interface connected to it.
  install a monitoring unit, MU, at a point of presence, POP, of the provider network,
  monitor a coupling of optical power by the customer into the provider network by the smart optical NT, particularly by measuring an optical power, particularly with a photo diode in the smart optical NT,
  provide an interaction connection between the smart optical NT and the monitoring unit via a traffic analysis point, TAP, for connectivity validation between the POP and the demarcation point, and
  monitor the connectivity between the POP and the demarcation point by using an optical spectrum analyser and/or an optical channel monitor to check and examine each single service to be provided via the public network to the customer network.

In an embodiment of a method according to the present disclosure, monitoring the coupling of optical power by the customer into the provider network comprises disconnecting a customer connection from the provider network whenever the optical power to be coupled by the customer into the provider network exceeds a laser safety threshold.

In a further embodiment of a method according to the present disclosure, monitoring the connectivity from the POP to the demarcation point comprises that, whenever a customer signal coming from a customer endpoint is not available at the smart optical NT, the smart optical NT switches to a loop mode and loops a signal from the POP as test signal back to the POP and the MU detects the looped back signal and verifies a fiber integrity and insertion loss of an optical path from the POP to the demarcation point, and as soon as a customer signal is present at the smart optical NT, the smart optical NT switches from the loop mode to a pass-through mode for that the customer signal is received at the PoP.

In still a further embodiment of a method according to the present disclosure, the MU checks an optical fiber integrity on an optical path from the POP to the demarcation point by implementing an optical time domain reflectometer, OTDR, function as fiber check, i.e. by injecting a series of optical pulses into an optical fiber under test along the optical path from the POP towards the customer.

Advantageously, the MU monitors bandwidth usage by measuring an actual available bandwidth on an optical path from the POP to the demarcation point, particularly in granular steps of 1 Gb/s, 10 Gb/s, 25 Gb/s and ≥100 Gb/s to determine if the customer is using a 1G, 10G, 25G or ≥100G signal.

In some further embodiments of a method according to the present disclosure, an internal switch is installed at the MU enabling the MU to be used at once for a plurality of different access lines.

Another aspect of the present invention refers to a usage of a system as described herein to execute a method as described herein.

An advantage of a system according to exemplary embodiments of the present disclosure is that it may be easily integrated in a telecommunication access procedure. The system replaces an active optical network termination equipment by keeping its most important functions, e.g. end-to-end control of a respective service and of a respective connection itself. Further, the system saves the need for an expensive termination equipment once and for all and economizes an on-site service effort. The customer can change a service or bandwidth without a need to change or adapt the smart optical NT. This enables SDN (software defined networking) usecases in future without the need to change a respective customer connection, i.e. a respective connection between the customer network and the public network.

Further advantages and configurations of the invention become apparent from the following description and the enclosed drawings.

It shall be understood that the features described previously and to be described subsequently may be used not only in the indicated combinations but also in different combinations or on their own without leaving the scope of the present invention.

FIG. 1 schematically shows a diagram of a system installed in a cross-border area between a provider network 120 and a customer network 110, according to the invention.

The customer network 110 comprises customer's premises equipment (CPE) 111, and customer's premises wiring. The provider network 120 comprises a respective network edge established here by a central office, CO. The CO comprises a passive central office part 121 and an active central office part 122. The active central office part 122 operates here as POP of the provider. A 2×2 optical switch 10 is installed as smart optical network termination device in the customer network 110 and serves as demarcation point between the customer network 110 and the provider network 120. The 2×2 optical switch 10 is a component of the system and is located on an optical path 130 that extends from the CPE 111 through the provider network 120 to connected service creation platforms 150. To be more precise, the 2×2 optical switch 10 is located in the customer network on the section of the optical path between CPE 111 and POP 122.

The smart optical network termination device may also be realized by a combination of two 1×2 optical switches or by a combination of a passive optical coupler and a 1×2 optical switch. Further suitable realizations of the smart optical NT are possible. On the way from the 2×2 optical switch 10 to the connected service creation platforms 150, signals from the CPE 111 pass through a subset of wavelength division multiplex stages to use a respective optical fiber multiple times for different services. Such passive WDM (Wavelength Division Multiplexer) components can be built as shown in FIG. 1 by a first extended DWDM (Dense Wavelength Division Multiplexer) 131 and a first pCWDM (passive Coarse WDM) 132, both located in the passive central office part 121 of the provider network 120, and a second pCWDM 133 and a second DWDM 134, both located in the active central office part 122 of the provider network 120 or in different setups like pDWDM filter only or pCWDM filter only as requested or as already existent in the public network 120. Signals from the connected service creation platforms 150 pass through the optical path 130 in the corresponding opposite direction and, thus, pass through the first and second DWDM MUX/DEMUX (Multiplexer/Demultiplexer) 131, 134 and the first and second pCWDM MUX/DEMUX 132, 133 arranged on it in the reverse order. As a further component of the system a monitoring unit, MU, 20 is installed in the provider network 120, more precisely, in the active central office part 122 of the provider network 120. The monitoring unit 20 is connected with the 2×2 optical switch 10 via a first traffic analysis point, TAP, 31 and a second optical traffic analysis point, TAP, 32. The first TAP 31 is installed between the first and second pCWDM 132 and 133. The second TAP 32 is installed between the second pCWDM 133 and the second DWDM 134. Both, the first TAP 31 and the second TAP 32 are located along the optical path 130 between the demarcation point 10 and the POP 122 wherein at both TAPs, 31 and 32, a respective portion of the light travelling along the optical path 130 is split out to the monitoring unit 20. Each of the two TAPs diverts about 10% of the light power within the respective fiber on which it is located.

The monitoring unit 20 comprises a channel monitor 21, fiber check component 22, and an internal switch 23.

The channel monitor 21 is an optical channel monitor to control a complete end-to-end transmission up to the 2×2 optical switch 10 including a control of a used bandwidth to determine which service the customer is using, e.g. if the customer is using a 1G, 10G, 25G or ≥100G signal. The channel monitor 21 is coupled via the switch 23 with the second TAP 32.

The fiber check component 22 comprises an OTDR and realizes an OTDR function to check that the respective fiber between the provider network 120 and the customer network 110, more precisely between the passive central office part 121 of the provider network 120 and the active central office part 122 of the provider network 120 is functioning. The fiber check 22 is coupled via the switch 23 with the first TAP 31.

The internal switch 23 enables the monitoring unit 20 to be used for different access lines, for up to 16 different access lines at once.

The 2×2 optical switch 10 is used at the customer site 110 to ensure a complete end-to-end monitoring by transmitting a service signal of a service in a normal pass-through mode, i.e. in a standard operation mode, as shown in illustration 10-1, or a loopback signal from the near end in a loop operation mode, as shown in illustration 10-2. Both, the service signal and the loopback signal will be monitored in the MU 20 at the POP 122. The 2×2 optical switch 10 prevents an entrance of (too) high optical laser power in a respective fiber for fiber and transmission security.

Illustration 10-1 shows the 2×2 optical switch 10 in its standard operation mode, wherein signals from the customer site 111 are directed through the 2×2 optical switch 10, as indicated by arrow 11, passing a TAP 16, i.e. a customer TAP, which diverts a part of the light power within the respective fiber on which it is located and leads it into a photodiode 15, i.e. a customer PD. Signals from the POP 122 are directed through the 2×2 optical switch 10, as indicated by arrow 12, passing a TAP 16, i.e. a provider TAP or transmission line TAP, which diverst a part of the light power within the respective fiber on which it is located and leads it into a respective photodiode 15, i.e. a provider PD.

Illustration 10-2 shows the 2×2 optical switch 10 in its loop operation mode wherein signals coming from the provider network 120 are looped as test signals back to the PoP 122. Those signals are also directed through the 2×2 optical switch 10, as indicated by arrow 13, passing the TAP 16, i.e. the transmission line TAP, which diverts a part of the light power within the respective fiber on which it is located and leads it into the photodiode 15, i.e. the provider PD.

The table shown in FIG. 2 gives an overview of switch states, i.e. operation modes of a smart optical NT as provided according to an embodiment of the claimed system. The optical power on the transmission line coming from the provider network 120 is measured via respective transmission line TAPs at the smart optical NT and the optical power on communication channels coming from the customer site 111 are measured via respective customer TAPs at the smart optical NT with a passive optical power coupler and/or a photodiode, PD, respectively.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 10 smart optical network termination device, smart optical NT 10-1 pass-through mode, standard operation mode
10-2 loop back mode, loop operation mode
11 arrow indicating data transmission from CPE to PoP
12 arrow indicating data transmission from PoP to CPE
13 arrow indicating looping back transmission line from POP to PoP
15 photo diode
16 TAP
20 monitoring unit
21 channel monitor
22 fiber check component
23 internal switch
31 first traffic analysis point, TAP
32 second traffic analysis point, TAP
110 customer network, customer site
111 customer's premises equipment, CPE
120 provider network, central office, CO
121 passive central office part of the provider network
122 active central office part of the provider network
130 optical path
131 first DWDM
132 first pCWDM
133 second pCWDM
134 second DWDM filter
150 connected service creation platforms

The invention claimed is:

1. A system installed in a cross-border area between a provider network of a provider and a customer network of a customer, wherein the system comprises:
 a smart optical network termination device (NT) at a site of the customer, wherein the smart optical NT is configured to implement a demarcation point between the customer network and the provider network, and wherein the smart optical NT is independent of a data rate passing through it and an optical interface connected to it; and
 a monitoring device located at a point of presence (POP) of the provider network;
 wherein the smart optical NT is further configured to monitor a coupling of optical power by the customer into the provider network and to interact with the monitoring device via at least one traffic analysis point (TAP) for connectivity validation from the POP to the demarcation point;
 wherein the smart optical NT is configured to, based on a customer signal coming from the customer endpoint not being available at the smart optical NT, switch to a loop operation mode and loop a signal from the POP back to the POP;
 wherein the smart optical NT is configured to, based on a customer signal being present at the smart optical NT, switch from the loop operation mode to a pass-through mode in which the smart optical NT transmits signals coming through the provider network to a customer endpoint of the customer site; and
 wherein the monitoring device is configured to check optical fiber integrity on an optical path from the PoP towards the customer by implementing an optical time domain reflectometer (OTDR) function.

2. The system according to claim 1, wherein the smart optical NT is realized by a 2×2 optical switch, by a combination of two 1×2 optical switches, or by a combination of a passive optical coupler and a 1×2 optical switch.

3. The system according to claim 1, wherein monitoring the coupling of optical power by the customer into the provider network comprises disconnecting a customer connection from the provider network based on the optical power to be coupled by the customer into the provider network exceeding a laser safety threshold and/or a defined optical input power threshold.

4. The system according to claim 1, wherein the monitoring device is configured to detect the looped-back signal and verify fiber integrity and insertion loss for an optical path from the POP to the demarcation point.

5. The system according to claim 1, wherein the monitoring device is further configured to monitor bandwidth usage by measuring an actual available bandwidth on an optical path from the POP to the demarcation point in granular steps of 1 Gb/s, 10 Gb/s, 25 Gb/s and ≥100 Gb/s to determine if the customer is using a 1G, 10G, 25G or ≥100G signal.

6. The system according to claim 1, wherein the monitoring device comprises an internal switch enabling the monitoring device to be used at once for a plurality of different access lines to any one of a number of connected service creation platforms.

7. A method for implementing a demarcation point between a provider network of a provider and a customer network of a customer, comprising:
 installing a smart optical network termination device (NT) at a site of the customer, the smart optical NT implementing the demarcation point between the customer network and the provider network, wherein the smart optical NT is independent of a data rate passing through it and an optical interface connected to it;
 installing a monitoring device at a point of presence (POP) of the provider network;
 monitoring a coupling of optical power by the customer into the provider network by the smart optical NT;
 providing an interaction connection between the smart optical NT and the monitoring device via at least one traffic analysis point (TAP) for connectivity validation from the POP to the demarcation point; and
 monitoring connectivity from the POP to the demarcation point;
 wherein based on a customer signal coming from the customer endpoint not being available at the smart optical NT, the smart optical NT switches to a loop operation mode and loops a signal from the POP back to the POP;
 wherein based on a customer signal being present at the smart optical NT, the smart optical NT switches from the loop operation mode to a pass-through mode in which the smart optical NT transmits signals coming through the provider network to a customer endpoint of the customer site; and
 wherein the monitoring device checks optical fiber integrity on an optical path from the PoP towards the customer by implementing an optical time domain reflectometer (OTDR) function.

8. The method according to claim 7, wherein monitoring the coupling of optical power by the customer into the provider network comprises:
 disconnecting a customer connection from the provider network based on the optical power to be coupled by the customer into the provider network exceeding a laser safety threshold and/or a defined optical input power threshold.

9. The method according to claim 7, wherein the monitoring device detects the looped back signal and verifies fiber integrity and insertion loss for an optical path from the POP to the demarcation point.

10. The method according to claim 7, wherein the monitoring device monitors bandwidth usage by measuring an actual available bandwidth on an optical path from the POP to the demarcation point, in granular steps of 1 Gb/s, 10 Gb/s, 25 Gb/s and ≥100 Gb/s to determine if the customer is using a 1G, 10G, 25G or ≥100G signal.

11. The method according to claim 7, wherein an internal switch is installed at the monitoring device enabling the monitoring device to be used at once for a plurality of different access lines to any one of a number of service creation platforms.

12. A non-transitory computer-readable medium having processor-executable instructions stored thereon for implementing a demarcation point between a provider network of a provider and a customer network of a customer, the processor-executable instructions, when executed, facilitating:

monitoring, by a smart optical network termination device (NT) at a site of the customer, a coupling of optical power by the customer into the provider network by the smart optical NT, wherein the smart optical NT implements the demarcation point between the customer network and the provider network, and wherein the smart optical NT is independent of a data rate passing through it and an optical interface connected to it; and monitoring connectivity from a point of presence (POP) of the provider network to the demarcation point, wherein an interaction connection between the smart optical NT and a monitoring device at the POP is provided via at least one traffic analysis point (TAP) for connectivity validation from the POP to the demarcation point;

wherein the smart optical NT is configured to, based on a customer signal coming from the customer endpoint not being available at the smart optical NT, switch to a loop operation mode and loop a signal from the POP back to the POP;

wherein the smart optical NT is configured to, based on a customer signal being present at the smart optical NT, switch from the loop operation mode to a pass-through mode in which the smart optical NT transmits signals coming through the provider network to a customer endpoint of the customer site; and wherein the monitoring device is configured to check optical fiber integrity on an optical path from the POP towards the customer by implementing an optical time domain reflectometer (OTDR) function.

* * * * *